United States Patent
Kono

(10) Patent No.: US 11,643,060 B2
(45) Date of Patent: May 9, 2023

(54) BRAKE CONTROLLING APPARATUS AND VEHICLE

(71) Applicant: SUBARU CORPORATION, Tokyo (JP)

(72) Inventor: Takashi Kono, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 312 days.

(21) Appl. No.: 16/988,797

(22) Filed: Aug. 10, 2020

(65) Prior Publication Data
US 2021/0070263 A1 Mar. 11, 2021

(30) Foreign Application Priority Data
Sep. 10, 2019 (JP) .............................. JP2019-164078

(51) Int. Cl.
*B60T 8/172* (2006.01)
*B60T 8/171* (2006.01)

(52) U.S. Cl.
CPC .............. *B60T 8/172* (2013.01); *B60T 8/171* (2013.01); *B60T 2210/20* (2013.01); *B60T 2270/608* (2013.01)

(58) Field of Classification Search
CPC ...... B60T 8/172; B60T 8/171; B60T 2210/20; B60T 2270/608
See application file for complete search history.

(56) References Cited

U.S. PATENT DOCUMENTS

| 8,510,011 B2 * | 8/2013 | Inoue .................... B60W 10/06 477/34 |
| 2004/0238244 A1 | 12/2004 | Amanuma et al. |
| 2017/0120892 A1 * | 5/2017 | Kato ........................ B60L 7/18 |

FOREIGN PATENT DOCUMENTS

| JP | 2004-166363 A | 6/2004 |
| JP | 2017034842 A * | 2/2017 |

* cited by examiner

*Primary Examiner* — Frederick M Brushaber
*Assistant Examiner* — Elizabeth Yang
(74) *Attorney, Agent, or Firm* — Troutman Pepper Hamilton Sanders LLP

(57) ABSTRACT

A brake controlling apparatus includes a gradient sensor, an operation unit, a brake controlling unit, and a storage unit. The gradient sensor is configured to detect a road gradient. The operation unit is configured to switch a constant speed downhill traveling function to become effective. The brake controlling unit is configured to control first and second regenerating units configured to generate regenerative electric power from braking torques of front and rear wheels, respectively. The storage unit is configured to hold an efficiency map. In a case where the constant speed downhill traveling function is caused to become effective, the brake controlling unit is configured to calculate braking torque distribution between the front and rear wheels based on the road gradient and the efficiency map to cause total regeneration efficiency to satisfy a first condition, and control the first and second regenerating units on a basis of the braking torque distribution.

20 Claims, 4 Drawing Sheets

BRAKE CONTROLLING APPARATUS AND VEHICLE

CROSS-REFERENCE TO RELATED APPLICATIONS

The present application claims priority from Japanese Patent Application No. 2019-164078 filed on Sep. 10, 2019, the entire contents of which are hereby incorporated by reference.

BACKGROUND

The technology relates to a brake controlling apparatus for an electric vehicle and to a vehicle.

Japanese Unexamined Patent Application Publication No. 2004-166363 discloses a technique of a hybrid vehicle provided with a front wheel motor and a rear wheel motor. During downhill traveling, the hybrid vehicle controls a regenerative braking torque of each of front wheels and rear wheels and a braking force of a hydraulic brake, thereby heightening efficiency of energy recovery.

SUMMARY

An aspect of the technology provides a brake controlling apparatus that includes a gradient sensor, an operation unit, a brake controlling unit, and a storage unit. The gradient sensor is configured to detect a road gradient. The operation unit is configured to switch a constant speed downhill traveling function to become effective. The brake controlling unit is configured to control a first regenerating unit and a second regenerating unit. The first regenerating unit is configured to generate regenerative electric power from a braking torque of front wheels. The second regenerating unit is configured to generate regenerative electric power from a braking torque of rear wheels. The storage unit is configured to hold an efficiency map. The efficiency map indicates a relationship between operation of the first regenerating unit and regeneration efficiency of the first regenerating unit and a relationship between operation of the second regenerating unit and regeneration efficiency of the second regenerating unit. In a case where the constant speed downhill traveling function is caused to become effective via the operation unit, the brake controlling unit is configured to calculate braking torque distribution between the front wheels and the rear wheels on the basis of the road gradient detected by the gradient sensor and the efficiency map to cause total regeneration efficiency to satisfy a first condition, and the brake controlling unit is configured to control the first regenerating unit and the second regenerating unit on the basis of the calculated braking torque distribution.

An aspect of the technology provides a vehicle. The vehicle includes a brake controlling apparatus. The brake controlling apparatus includes a gradient sensor, an operation unit, a brake controlling unit, and a storage unit. The gradient sensor is configured to detect a road gradient. The operation unit is configured to switch a constant speed downhill traveling function to become effective. The brake controlling unit is configured to control a first regenerating unit and a second regenerating unit. The first regenerating unit is configured to generate regenerative electric power from a braking torque of front wheels. The second regenerating unit is configured to generate regenerative electric power from a braking torque of rear wheels. The storage unit is configured to hold an efficiency map. The efficiency map indicates a relationship between operation of the first regenerating unit and regeneration efficiency of the first regenerating unit and a relationship between operation of the second regenerating unit and regeneration efficiency of the second regenerating unit. In a case where the constant speed downhill traveling function is caused to become effective via the operation unit, the brake controlling unit is configured to calculate braking torque distribution between the front wheels and the rear wheels on the basis of the road gradient detected by the gradient sensor and the efficiency map to cause total regeneration efficiency to satisfy a first condition, and the brake controlling unit is configured to control the first regenerating unit and the second regenerating unit on the basis of the calculated braking torque distribution.

An aspect of the technology provides a brake controlling apparatus that includes a gradient sensor, an operation unit, circuitry, and a storage unit. The gradient sensor is configured to detect a road gradient. The operation unit is configured to switch a constant speed downhill traveling function to become effective. The circuitry is configured to control a first regenerating unit and a second regenerating unit. The first regenerating unit is configured to generate regenerative electric power from a braking torque of front wheels. The second regenerating unit is configured to generate regenerative electric power from a braking torque of rear wheels. The storage unit is configured to hold an efficiency map. The efficiency map indicates a relationship between operation of the first regenerating unit and regeneration efficiency of the first regenerating unit and a relationship between operation of the second regenerating unit and regeneration efficiency of the second regenerating unit. In a case where the constant speed downhill traveling function is caused to become effective via the operation unit, the circuitry is configured to calculate braking torque distribution between the front wheels and the rear wheels on the basis of the road gradient detected by the gradient sensor and the efficiency map to cause total regeneration efficiency to satisfy a first condition, and control the first regenerating unit and the second regenerating unit on the basis of the calculated braking torque distribution.

BRIEF DESCRIPTION OF THE DRAWINGS

The accompanying drawings are included to provide a further understanding of the disclosure, and are incorporated in and constitute a part of this specification. The drawings illustrate one example embodiment and, together with the specification, serve to explain the principles of the disclosure.

DETAILED DESCRIPTION

Figure 1:
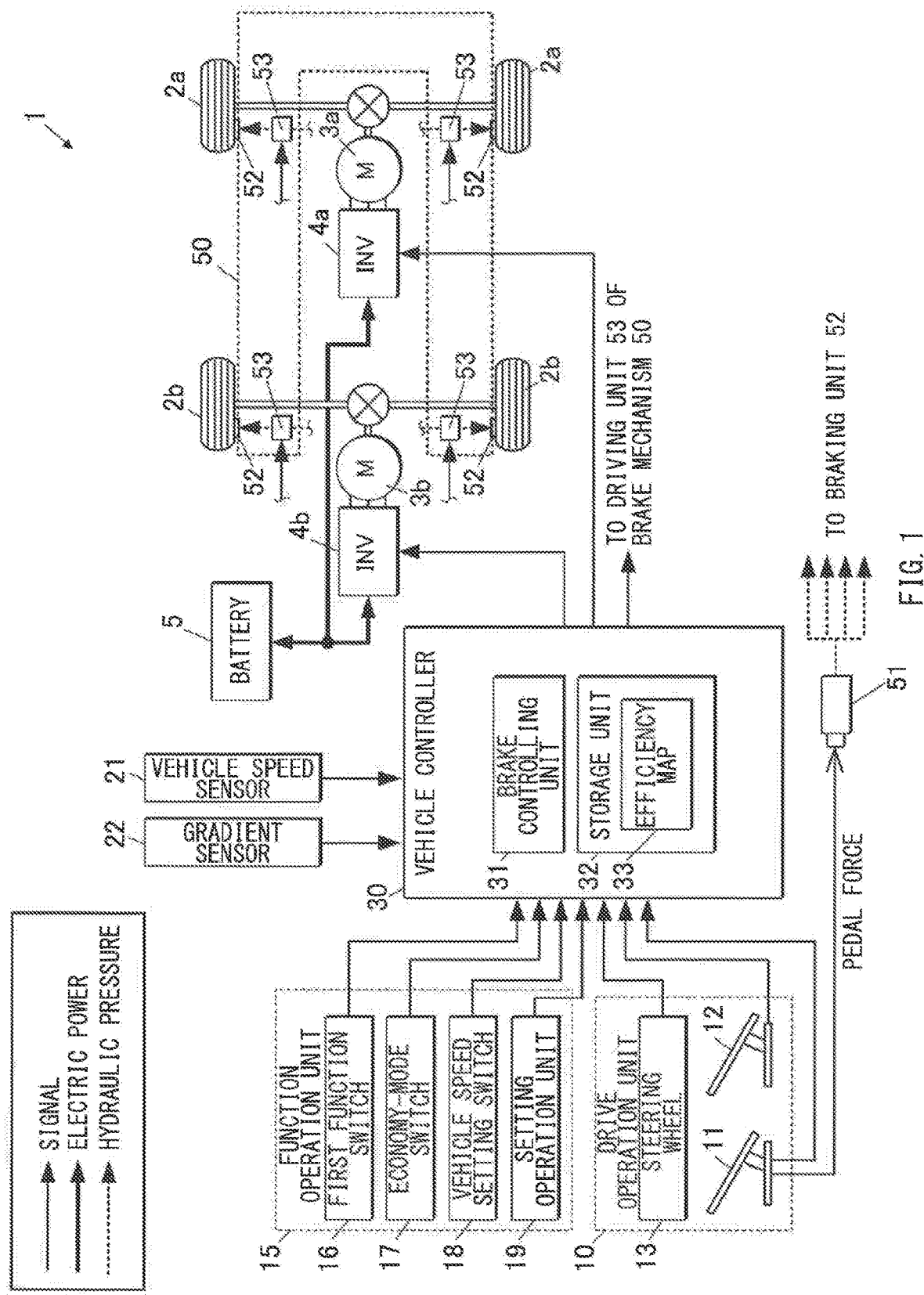
FIG. 1 is a block diagram illustrating one example of a configuration of an electric vehicle according to one embodiment of the technology.

In recent years, a vehicle provided with a constant speed downhill traveling function of automatically controlling a braking force so that a constant vehicle speed is maintained while traveling on a downhill road has been made practicable. The constant speed downhill traveling function allows a driver to cause the vehicle to travel on a downhill road at a vehicle speed designated in advance without carrying out brake operation.

Here, even in a case where the constant speed downhill traveling function is effective, there is little need to strictly control the vehicle speed to the vehicle speed designated in advance, and slight variation in the vehicle speed is often allowed. Further, by utilizing regenerative braking for the constant speed downhill traveling function, it is possible to utilize regeneration energy, making it possible to extend a cruising distance of an electric vehicle or a hybrid vehicle.

It is desirable to provide a brake controlling apparatus for a vehicle that allows for improvement in regeneration efficiency in a constant speed downhill traveling function.

Hereinafter, one example embodiment of the technology will be described in detail with reference to the drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiment which are not recited in a most-generic independent claim of the disclosure are optional and may be provided on an as-needed basis. Throughout the present specification and the drawings, elements having substantially the same function and configuration are denoted with the same numerals to avoid any redundant description.

Figure 2A:
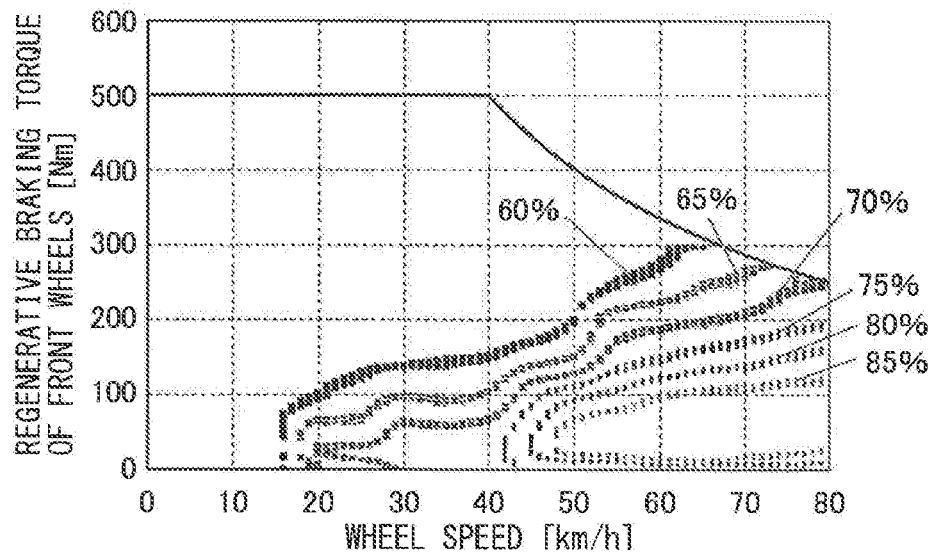
FIG. 2A is a diagram illustrating one example of an efficiency map of regenerative braking by front wheels.
Figure 2B:
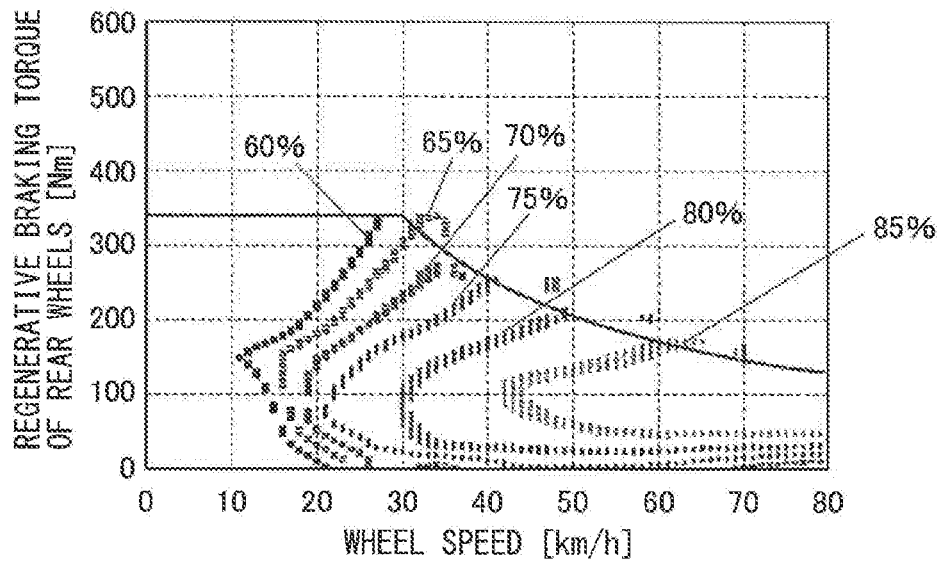
FIG. 2B is a diagram illustrating one example of an efficiency map of regenerative braking by rear wheels.
Figure 2C:
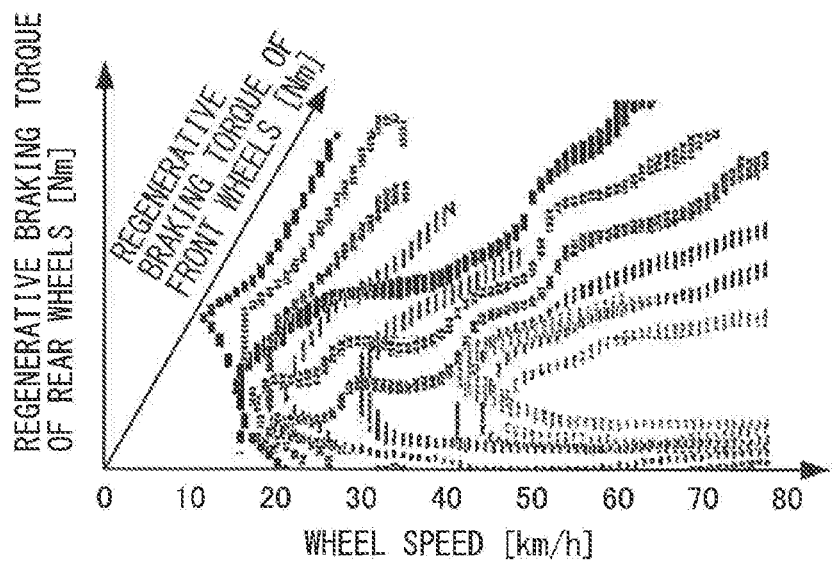
FIG. 2C is a diagram illustrating one example of an efficiency map of regenerative braking by the front and rear wheels.

FIG. 1 is a block diagram illustrating a configuration of an electric vehicle according to one example embodiment of the technology. FIGS. 2A to 2C each illustrate one example of an efficiency map of regenerative braking. FIG. 2A is an efficiency map for front wheels, FIG. 2B is an efficiency map for rear wheels, and FIG. 2C is an efficiency map for the front and rear wheels.

An electric vehicle 1 according to the present example embodiment may include two front wheels 2a, two rear wheels 2b, a first traveling motor 3a, a second traveling motor 3b an inverter 4a, an inverter 4b, a battery 5, a brake mechanism 50, and a vehicle speed sensor 21. The electric vehicle 1 also includes a gradient sensor 22. The first traveling motor 3a may drive the front wheels 2a. The second traveling motor 3b may drive the rear wheels 2b. The inverter 4a may drive the first traveling motor 3a. The inverter 4b may drive the second traveling motor 3b. The battery 5 may supply electric power for traveling to the two inverters 4a and 4b. The brake mechanism 50 may generate and apply a braking force to the front wheels 2a, the rear wheels 2b, or both of them. The gradient sensor 22 is configured to detect a road gradient. The vehicle speed sensor 21 may detect a vehicle speed.

The electric vehicle 1 may further include a drive operation unit 10, a function operation unit 15, and a vehicle controller 30. The drive operation unit 10 may include a brake pedal 11, an accelerator pedal 12, and a steering wheel 13. The function operation unit 15 may switch each of various kinds of functions between an effective state and an ineffective state. The vehicle controller 30 may control the electric vehicle 1. The vehicle controller 30 includes a brake controlling unit 31 and a storage unit 32. The brake controlling unit 31 is configured to control regeneration of the first traveling motor 3a and regeneration of the second traveling motor 3b, and also control the brake mechanism 50. The storage unit 32 may hold various kinds of control data. The storage unit 32 may holds an efficiency map 33. The efficiency map 33 indicates a relationship between operation of the first traveling motor 3a and regeneration efficiency thereof and a relationship between operation of the second traveling motor 3b and regeneration efficiency thereof. The operation of the first traveling motor 3a may include a wheel speed and a regenerative braking torque related to the first traveling motor 3a. The operation of the second traveling motor 3b may include a wheel speed and a regenerative braking torque related to the second traveling motor 3b.

In one embodiment, a combination of the brake controlling unit 31, the storage unit 32, sensors such as the vehicle speed sensor 21 or the gradient sensor 22, and the function operation unit 15 illustrated in FIG. 1 may serve as a "brake controlling apparatus". In one embodiment, the first traveling motor 3a may serve as a "first regenerating unit", and the second traveling motor 3b may serve as a "second regenerating unit".

The first traveling motor 3a and the inverter 4a may be configured to execute power running and regenerative operation. A driving force may be generated by the power running thereof, and a braking force may be generated by the regenerative operation thereof. Each of the driving force and the braking force may be transmitted to the front wheels 2a. The first traveling motor 3a may be an electric motor, and a regenerative electric power generated by the first traveling motor 3a may be transmitted to the battery 5 via the inverter 4a during the regenerative operation. As illustrated in FIG. 2A, regeneration efficiency of the first traveling motor 3a may vary, for example, between 60% and 80% in accordance with the wheel speed of each of the front wheels 2a and the regenerative braking torque thereof. Namely, the regeneration efficiency may indicate a ratio of regeneration energy with respect to braking energy.

Similarly, the second traveling motor 3b and the inverter 4b may be configured to execute power running and regenerative operation. A driving force may be generated by the power running thereof, and a braking force may be generated by the regenerative operation thereof. Each of the driving force and the braking force may be transmitted to the rear wheels 2b. The second traveling motor 3b may be an electric motor, and a regenerative electric power generated by the second traveling motor 3b may be transmitted to the battery 5 via the inverter 4b during the regenerative operation. As illustrated in FIG. 2B, regeneration efficiency of the second traveling motor 3b may vary, for example, between 60% and 80% in accordance with the wheel speed of each of the rear wheels 2b and the regenerative braking torque thereof. Specifications of the first traveling motor 3a may be different from specifications of the second traveling motor 3b. In such a case, the efficiency map 33 for the regeneration efficiency of the first traveling motor 3a may be different from the efficiency map 33 for the regeneration efficiency of the second traveling motor 3b.

As illustrated in FIG. 2A and FIG. 2B, the efficiency map 33 stored in the storage unit 32 may include two pieces of map data that are independent from each other, that is, the map data for the front wheels 2a and the map data for the rear wheels 2b. Alternatively, as illustrated in FIG. 2C, the efficiency map 33 may include map data indicating a relationship among braking torque distribution between the regenerative braking torque of the front wheels 2a and the regenerative braking torque of the rear wheels 2b, the wheel speed, and total regeneration efficiency. The braking torque distribution may refer to a combination of or a ratio between the regenerative braking torque of the front wheels 2a and the regenerative braking torque of the rear wheels 2b. The map data illustrated in FIG. 2C may be obtained from the pieces of map data illustrated in FIG. 2A and FIG. 2B.

The battery 5 may be a lithium-ion secondary battery or a nickel-hydrogen secondary battery, for example. The electric vehicle 1 may be a hybrid electric vehicle (HEV) provided with a combustion engine. In such a case, the battery 5 may be a lead-acid battery.

The brake mechanism 50 may include a braking unit 52 such as a caliper brake or a drum brake, a master cylinder 51, and a hydraulic pressure circuit. The braking unit 52 may apply a braking force to the front wheels 2a, the rear wheels 2b or both of them. The master cylinder 51 and the hydraulic pressure circuit may transmit operation performed on the brake pedal 11 to the braking unit 52. A driving unit 53 configured to adjust a hydraulic pressure by a control of the brake controlling unit 31 may be provided in the hydraulic pressure circuit.

The function operation unit 15 may include a first function switch 16, an economy-mode switch 17, a vehicle speed setting switch 18, and a setting operation unit 19. The first function switch 16 performs switching between an effective state and an ineffective state of a constant speed downhill traveling function. In one embodiment, the first function switch 16 may serve as an "operation unit". The economy-mode switch 17 may perform switching between an effective state and an ineffective state of an economy mode. The vehicle speed setting switch 18 may set a vehicle speed during execution of the constant speed downhill traveling function. The setting operation unit 19 may allow for option setting or any other setting. The function operation unit 15 may be disposed at a position that allows a user such as a driver to operate the function operation unit 15. A display element may be provided on a meter panel or any other location, for example. The driver may be allowed to visually recognize a selection status of each of the switches on the basis of an output of a lamp or a display panel included in the display element.

The constant speed downhill traveling function to be switched by the first function switch 16 may cause a braking force to be automatically controlled so as to maintain a set vehicle speed without operation performed on the brake pedal 11 by the driver while the vehicle travels on a downhill road. The set vehicle speed may be any of a vehicle speed set in advance within a predetermined range via the vehicle speed setting switch 18 by the driver or a user, a vehicle speed set as a default, and a vehicle speed automatically determined on the basis of a vehicle speed at a point of time when the constant speed downhill traveling function is switched to become effective. However, the vehicle speed to be controlled by the constant speed downhill traveling function may be limited to a low or middle speed (for example, from 5 km/h to 40 km/h).

The economy mode to be switched by the economy-mode switch 17 may be a mode prioritizing improvement of energy efficiency. A control of the constant speed downhill traveling function may be different between a case where the economy mode is ineffective and a case where the economy mode is effective. For example, the constant speed downhill traveling function in the case where the economy mode is ineffective may execute a constant speed downhill traveling control mainly based on a control of the brake mechanism 50. The constant speed downhill traveling function in the case where the economy mode is effective may execute the constant speed downhill traveling control mainly utilizing the regenerative braking.

The vehicle controller 30 may receive detection signals from the vehicle speed sensor 21 and the gradient sensor 22, and an operation signal from the drive operation unit 10 to control the inverters 4a and 4b and the brake mechanism 50 on the basis of these signals. The brake controlling unit 31 of the vehicle controller 30 may perform the regenerative operation of the inverter 4a and 4b and a driving control of the brake mechanism 50. The vehicle controller 30 may include a single electronic control unit (ECU), or may include two or more ECUs that operate in cooperation with each other by communicating with each other. A central processing unit (CPU) provided in the ECU may execute a control program, whereby a usual traveling control may be achieved by the vehicle controller 30. It is to be noted that a program for the constant speed downhill traveling processing executed by the brake controlling unit 31 may be included in the control program.

[Constant Speed Downhill Traveling Processing]

Figure 3:
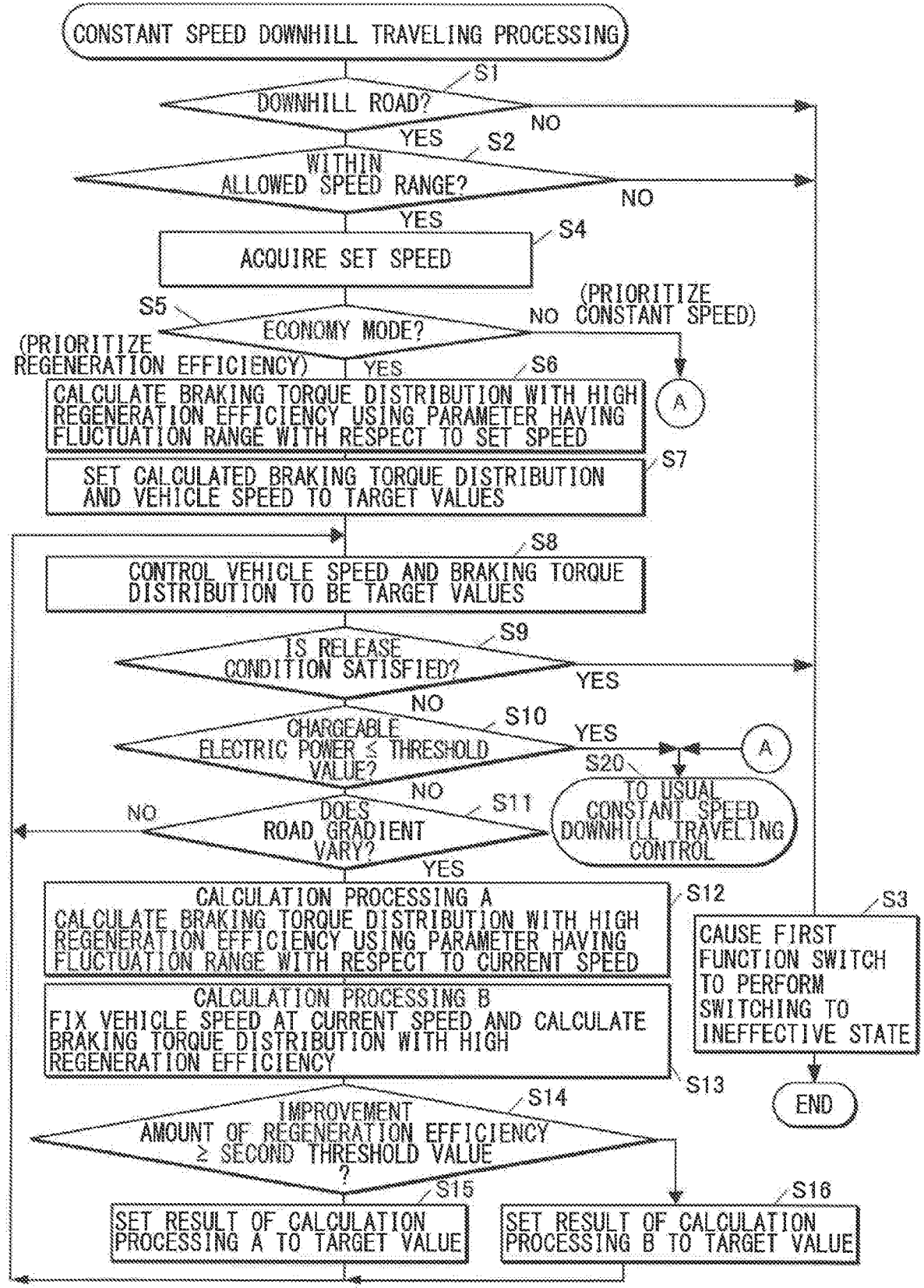
FIG. 3 is a flowchart illustrating one example of constant speed downhill traveling processing executed by a brake controlling unit.

FIG. 3 is a flowchart illustrating one example of the constant speed downhill traveling processing executed by the brake controlling unit 31.

The constant speed downhill traveling processing may be started in response to switching of the constant speed downhill traveling function to the effective state by the first function switch 16. When the constant speed downhill traveling processing is started, the brake controlling unit 31 may first determine whether a road on which the electric vehicle 1 travels currently is a downhill road on the basis of a detection signal of the gradient sensor 22 (Step S1). Thereafter, the brake controlling unit 31 may determine whether a current vehicle speed is within a speed range (for example, 40 km/h or slower), which is allowed in the constant speed downhill traveling function, on the basis of a detection signal of the vehicle speed sensor 21 (Step S2). As a result of determination in Steps S1 and S2, in a case where it is determined that the current road is not a downhill road ("NO" in Step S1) or in a case where it is determined that the current vehicle speed exceeds the allowed speed ("NO" in Step S2), the brake controlling unit 31 may cause the first function switch 16 to switch the constant speed downhill traveling function to an ineffective state (Step S3), and terminate the constant speed downhill traveling processing. In contrast, in a case where it is determined that the current road is a downhill road and the current vehicle speed is within the allowed speed ("YES" in Step S2), the brake controlling unit 31 may cause the processing flow to shift to Step S4.

In Step S4, the brake controlling unit 31 may acquire a speed set for the constant speed downhill traveling function, which is hereinafter referred to as a "set speed", from the vehicle speed setting switch 18 or the storage unit 32, for example. If the driver has carried out setting operation of the vehicle speed for the constant speed downhill traveling function via the vehicle speed setting switch 18 before the first function switch 16 switches the constant speed downhill traveling function to the effective state, in Step S4, the brake controlling unit 31 may read out the set speed thus set and stored in the storage unit 32. Further, in a case where the vehicle speed for a case where the first function switch 16 is in the effective state is set as the set speed, in Step S4, the brake controlling unit 31 may acquire a current vehicle speed as the set speed on the basis of the detection signal of the vehicle speed sensor 21.

Thereafter, the brake controlling unit 31 may determine whether the economy mode is selected by operation performed on the economy-mode switch 17 (Step S5). As a result, in a case where it is determined that the economy mode is not selected ("NO" in Step S5), the brake controlling unit 31 may cause the processing flow to shift to a usual constant speed downhill traveling control (Step S20). In contrast, in a case where it is determined that the economy mode is selected ("YES" in Step S5), the brake controlling unit 31 may cause the processing flow to shift to a constant speed downhill traveling control (Steps S6 to S16) that prioritizes regeneration efficiency.

Although the details are omitted, in a process of the usual constant speed downhill traveling control in Step S20, the brake controlling unit 31 may control the driving unit 53 of the brake mechanism 50 to maintain the vehicle speed at the set speed. In the usual constant speed downhill traveling control, the brake controlling unit 31 may be configured to use the regeneration control together if chargeable electric power of the battery 5 is large, that is, if a charge rate of the battery 5 is low, in one example. The chargeable electric power is an amount of electric power with which the battery 5 is still allowed to be charged. Further, the brake controlling unit 31 may be configured to prohibit the regeneration control or lower a ratio of the regeneration control if the chargeable electric power of the battery 5 is small, that is, if the charge rate of the battery 5 is high, in one example.

When it is determined in Step S5 that the economy mode is selected and the processing flow is caused to shift to the constant speed downhill traveling control that prioritizes the regeneration efficiency, the brake controlling unit 31 may first calculate braking torque distribution on the basis of the efficiency map 33 and an output of the gradient sensor 22 (Step S6). The braking torque distribution may satisfy a predetermined condition for improving the regeneration efficiency. In one embodiment, this predetermined condition may serve as a "first condition". As the predetermined condition for improving the regeneration efficiency, for example, a condition that the regeneration efficiency becomes the highest, or a condition that the regeneration efficiency falls within a range to a few percent lower from the highest regeneration efficiency.

In the calculation in Step S6, the brake controlling unit 31 may not fix the vehicle speed at the set speed, but may deem the vehicle speed as a parameter having a predetermined fluctuation range with respect to the set speed. For example, the brake controlling unit 31 may use, as the vehicle speed, a parameter v1 (v1=15±2 (km/h)) having the predetermined fluctuation range (for example, +2 (km/h)) with respect to the set speed (for example, 15 (km/h)). Thereafter, the brake controlling unit 31 may calculate a total braking torque Trbtot for maintaining the vehicle speed at a constant value on the basis of the road gradient, the vehicle speed, and a known vehicle weight, and divide the total braking torque Trbtot to a regenerative braking torque Trbfr of the front wheels 2a and a regenerative braking torque Trbrr of the rear wheels 2b as parameters that satisfy "Trbtot=Trbfr+Trbrr". Thereafter, the brake controlling unit 31 may search, from the efficiency map 33, a range indicated by the vehicle speed parameter v1 described above and the respective parameters Trbfr and Trbrr of the regenerative braking torques of the front wheels 2a and the rear wheels 2b, and find a map position at which the total regeneration efficiency becomes the highest. When the map position is found in this manner, the vehicle speed and the braking torque distribution between the regenerative braking torque of the front wheels 2a and the regenerative braking torque of the rear wheels 2b, which correspond to the map position, may be determined uniquely.

When the vehicle speed and the braking torque distribution are calculated, the brake controlling unit 31 may set these calculation results as target values to be controlled (Step S7), and cause the processing flow to shift to loop processing (Steps S8 to S11) of the constant speed downhill traveling control.

In the loop processing, the brake controlling unit 31 may first control the inverters 4a and 4b on the basis of the detection signal of the vehicle speed sensor 21 so that each of the vehicle speed, the regenerative braking torque of the front wheels 2a, and the regenerative braking torque of the rear wheels 2b matches the corresponding target value, and generate the regenerative braking torques of the front wheels 2a and the rear wheels 2b (Step S8).

Thereafter, the brake controlling unit 31 may determine whether a release condition for the constant speed downhill traveling function is satisfied (Step S9). This release condition may refer to the end of the downhill road with a gradient or execution of a release operation by the driver. The release operation may be, for example, the operation performed on the brake pedal 11, operation performed on the accelerator pedal 12, and operation to cause the first function switch 16 to switch the constant speed downhill traveling function to the ineffective state, for example. In a case where it is determined that the release condition is satisfied ("YES" in Step S9), the brake controlling unit 31 may cause the first function switch 16 to switch the constant speed downhill traveling function to the ineffective state (Step S3), and terminate the constant speed downhill traveling processing. In contrast, in a case where it is determined that the release condition is not satisfied ("NO" in Step S9), the brake controlling unit 31 may cause the processing flow to shift to Step S10.

In Step S10, the brake controlling unit 31 may confirm a charging state of the battery 5 by an unillustrated sensor, and determine whether the chargeable electric power of the battery 5 is a threshold value or lower. Then, in a case where it is determined that the chargeable electric power is the threshold value or lower ("YES" in Step S10), the brake controlling unit 31 may cause the processing flow to shift to the usual constant speed downhill traveling control (Step S20). One reason for this is because accumulation of the regeneration energy is prohibited in a current state of the battery 5. In contrast, in a case where it is determined that the chargeable electric power is not the threshold value or lower ("NO" in Step S10), the brake controlling unit 31 may cause the processing flow to shift to Step S11.

In Step S11, on the basis of the detection signal of the gradient sensor 22 and a threshold value set in advance, the brake controlling unit 31 may determine whether the road gradient varies compared with that at a time when the constant speed downhill traveling processing has been started. It is to be noted that, in Step S11, the brake controlling unit 31 may determine slight variation (for example, variation within the threshold value or smaller, such as 2° or smaller) as no variation. In a case where it is determined that the road gradient does not vary ("NO" in Step S11), the brake controlling unit 31 may cause the processing flow to return to Step S8, and continue the loop processing in Steps S8 to S11. In contrast, in a case where it is determined that the road gradient varies ("YES" in Step S11), the brake controlling unit 31 may cause the processing flow to temporarily exit from the loop processing in Steps S8 to S11, and cause the processing flow to shift to Step S12.

When it is determined that the road gradient varies and the processing flow exits from the loop processing temporarily, the brake controlling unit 31 may calculate the braking torque distribution again by two kinds of methods (Steps S12 and S13).

In calculation processing A in Step S12, the brake controlling unit 31 may use the vehicle speed, that is, the wheel speed, as a parameter having a fluctuation range with respect to the vehicle speed at that point of time, and calculate the braking torque distribution, by which the regeneration efficiency is improved, on the basis of the detection signal of the gradient sensor 22 and the efficiency map 33. When recalculation in Step S12 is compared with calculation in Step S6, a value of the total braking torque Trbtot for maintaining the vehicle speed at the constant value may be different from each other. One reason for this is because the gradient varies. Moreover, a vehicle speed parameter v2 may be changed to a value (for example, 16.5±2 (km/h)) having a predetermined fluctuation range (for example, ±2 (km/h)) with respect to the current vehicle speed (that is, the vehicle speed as a calculation result in Step S8 (for example, 16.5 (km/h)). In Step S12, the brake controlling unit 31 may search a range of each of the parameters described above in the efficiency map 33, and find a map position at which the total regeneration efficiency becomes the highest. Thereafter, the brake controlling unit 31 may obtain the vehicle speed, that is, the wheel speed (for example, 14.5 (km/h)), and the braking torque distribution from the map position as calculation results.

In calculation processing B in Step S13, the brake controlling unit 31 may fix the vehicle speed at a current speed, and use only the braking torque distribution as a variable parameter to calculate the braking torque distribution by which the regeneration efficiency is improved. The calculation in Step S13 may be similar to the calculation in Step S12 except for a condition that the vehicle speed is set to a fixed value without any fluctuation range. As a result of the calculation in Step S13, the braking torque distribution by which the regeneration efficiency is improved while fixing the vehicle speed may be obtained.

After the calculation processing A in Step S12 and the calculation processing B in Step S13 are executed, the brake controlling unit 31 may calculate how much the total regeneration efficiency that is the result of the calculation processing A is improved compared with the total regeneration efficiency that is the result of the calculation processing B, and determine whether an improvement amount of the regeneration efficiency in a case of the calculation processing A with respect to that in a case of the calculation processing B is a second threshold value or more (Step S14). The second threshold value may be set in advance. In a case where it is determined that the improvement amount of the regeneration efficiency is the second threshold value or more ("YES" in Step S14), the brake controlling unit 31 may set the result of the calculation processing A to a target value to be controlled (Step S15). In contrast, in a case where it is determined that the improvement amount of the regeneration efficiency is not the second threshold value or more ("NO" in Step S14), the brake controlling unit 31 may set the result of the calculation processing B to a target value to be controlled (Step S16).

If total regeneration efficiency is improved largely by the processes in Steps S12 to S16 when the road gradient varies in this manner, a constant speed downhill traveling control by first control processing may be executed. In the first control processing, improvement of the regeneration efficiency may be prioritized while variation in the vehicle speed is permitted. In contrast, if the total regeneration efficiency does not vary largely when the road gradient varies, constant speed downhill traveling control by second control processing may be executed. In the second control processing, maintenance of the vehicle speed may be prioritized. It is to be noted that selection between the first control processing and the second control processing is not limited only to the case where any one is selected therefrom on the basis of the improvement amount of the regeneration efficiency. For example, the brake controlling apparatus according to the present example embodiment may be so configured that, on the basis of the option setting carried out via the setting operation unit 19, any one of execution of only the first control processing, execution of only the second control processing, or selection based on the improvement amount of the regeneration efficiency is selected by the user such as the driver.

When a new target value is set in Step S15 or Step S16, the brake controlling unit 31 may cause the processing flow to return to the loop processing of the constant speed downhill traveling control (Steps S8 to S11) again. Further, the brake controlling unit 31 may so execute the regeneration control through this loop processing as to achieve the vehicle speed and braking torque distribution of the respective target values thus newly set.

When the constant speed downhill traveling control is released during the loop processing in Steps S8 to S11 as a result of the end of the downhill road or operation performed on the brake pedal 11 or the accelerator pedal 12 by the driver, the constant speed downhill traveling processing may be terminated after the process in Step S3.

Figure 4:
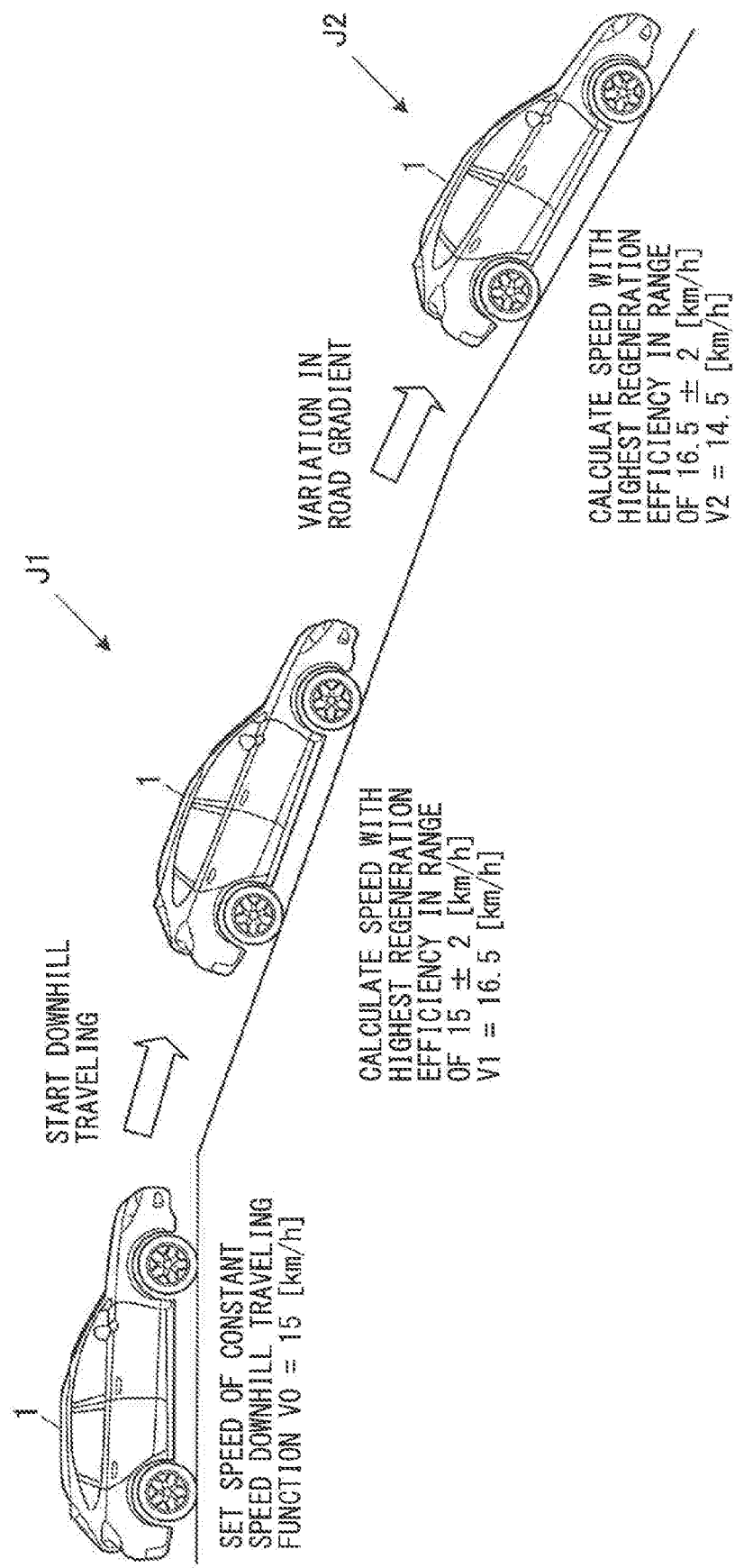
FIG. 4 is an explanatory diagram illustrating one example of transition of a traveling state of the electric vehicle by the constant speed downhill traveling function.

FIG. 4 illustrates one example of transition of a traveling state of the electric vehicle 1 by the constant speed downhill traveling function. FIG. 4 illustrates a traveling example of a case where the electric vehicle 1 sets the constant speed downhill traveling function to an effective state to start downhill traveling, and a road gradient varies in the middle of the downhill road.

When the first control processing that prioritizes improvement of regeneration efficiency in the constant speed downhill traveling processing is executed, as illustrated in FIG. 4 as a downhill traveling status J1, a vehicle speed may shift slightly from a set speed V0 at the time of start of downhill traveling and the electric vehicle 1 may travel at the shifted vehicle speed. However, since the vehicle speed is not fixed, calculation of braking torque distribution allowing for further improvement in regeneration efficiency may be made. In this case, the vehicle speed in the downhill traveling status J1 may be a set speed V1. Moreover, when the road gradient varies, as illustrated in FIG. 4 as a downhill traveling status J2, the vehicle speed may vary slightly from the speed V1 before variation of the road gradient and the electric vehicle 1 may travel at the varied vehicle speed. However, since the vehicle speed is not fixed, calculation of braking torque distribution allowing for further improvement in regeneration efficiency may be made. In this case, the vehicle speed in the downhill traveling status J2 may be a set speed V2. This makes it possible to improve the regeneration efficiency. Therefore, it is possible to raise a charge rate of the battery and thereby increase a cruising distance of the electric vehicle 1.

As described above, according to the electric vehicle 1 and the brake controlling apparatus therein of the present example embodiment, the brake controlling apparatus according to the present example embodiment may include:

the gradient sensor 22; the first function switch 16 configured to switch the constant speed downhill traveling function between the effective state and the ineffective state; the first traveling motor 3a configured to generate regenerative electric power from a braking torque of the front wheels 2a; the second traveling motor 3b configured to generate regenerative electric power from a braking torque of the rear wheels 2b; the brake controlling unit 31 configured to control the regenerative operation; and the storage unit 32 configured to hold the efficiency map 33 for the regenerative braking. Further, in a case where the constant speed downhill traveling function is caused to become effective via the first function switch 16, the brake controlling unit 31 is configured to calculate the braking torque distribution between the front wheels 2a and the rear wheels 2b, that is, distribution of a braking torque generated by the regenerative braking, by which the total regeneration efficiency is improved, on the basis of the road gradient detected by the gradient sensor 22 and the efficiency map 33. Further, the brake controlling unit 31 may execute the regenerative control of the first traveling motor 3a and the second traveling motor 3b in accordance with the calculated braking torque distribution. Therefore, it is possible to improve the regeneration efficiency during the execution of the constant speed downhill traveling function, making it possible to increase the cruising distance of the electric vehicle 1.

Moreover, according to the electric vehicle 1 and the brake controlling apparatus therein of the present example embodiment, in the constant speed downhill traveling control that prioritizes improvement in the regeneration efficiency, the brake controlling unit 31 may calculate the braking torque distribution on the basis of the parameter, for the vehicle speed, having the fluctuation range (Step S6). Thus, although an actual vehicle speed is slightly shifted from the speed set for the constant speed downhill traveling function, it is possible to thereby achieve distribution of the regenerative braking torque between the front wheels 2a and the rear wheels 2b with high regeneration efficiency. Therefore, it is possible to improve the regeneration efficiency during execution of the constant speed downhill traveling function, making it possible to increase the cruising distance of the electric vehicle 1.

Moreover, according to the electric vehicle 1 and the brake controlling apparatus therein of the present example embodiment, in a case where the gradient sensor 22 detects that the road gradient varies during execution of the constant speed downhill traveling function, the brake controlling unit 31 may calculate the braking torque distribution again by using the parameter having the fluctuation range with respect to the vehicle speed at that time (Step S12). Thus, in a case where the road gradient varies during the constant speed downhill traveling function, the vehicle speed may vary slightly. However, it is possible to thereby achieve distribution of the regenerative braking torque between the front wheels 2a and the rear wheels 2b with high regeneration efficiency in accordance with the variation of the road gradient. Therefore, even in a case where the road gradient varies during execution of the constant speed downhill traveling function, it is also possible to improve the regeneration efficiency during execution of the constant speed downhill traveling function, making it possible to increase the cruising distance of the electric vehicle 1.

Moreover, according to the electric vehicle 1 and the brake controlling apparatus therein of the present example embodiment, in a case where the gradient sensor 22 detects that the road gradient varies during execution of the constant speed downhill traveling function, the brake controlling unit 31 may selectively execute the first control processing in which variation of the vehicle speed is allowed (Steps S12, S15, and S8) or the second control processing in which the vehicle speed is maintained at the constant value (Steps S13, S16, and S8). Therefore, it is possible to achieve the constant speed downhill traveling function suitable for each of a status that the vehicle speed is to be maintained at the constant value and a status that slight variation of the vehicle speed is allowed and the regeneration efficiency is thereby to be improved.

Moreover, according to the electric vehicle 1 and the brake controlling apparatus therein of the present example embodiment, in a case where the gradient sensor 22 detects that the road gradient varies during execution of the constant speed downhill traveling function, the brake controlling unit 31 may compare the regeneration efficiency obtained by the first control processing in which variation of the vehicle speed is allowed with the regeneration efficiency obtained by the second control processing in which the vehicle speed is maintained at the constant value, and calculate the improvement amount of the regeneration efficiency obtained by the first control processing. Further, the brake controlling unit 31 may determine whether the improvement amount of the regeneration efficiency obtained by the first control processing is the second threshold value or more compared with that obtained by the second control processing (Step S14). In a case where it is determined that this improvement amount of the regeneration efficiency is the second threshold value or more, the brake controlling unit 31 may execute the first control processing (Steps S15 and S8). In contrast, in a case where it is determined that this improvement amount of the regeneration efficiency is less than the second threshold value, the brake controlling unit 31 may execute the second control processing (Steps S16 and S8). Therefore, in a case where the gradient sensor 22 detects that the road gradient varies during execution of the constant speed downhill traveling function and the regeneration efficiency varies on the basis of whether the vehicle speed is to be varied, it is possible to prioritize improvement of the regeneration efficiency by allowing the vehicle speed to vary during execution of the constant speed downhill traveling function. In contrast, if the regeneration efficiency does not vary in this case, it is possible to prioritize maintenance of the vehicle speed.

Moreover, according to the electric vehicle 1 and the brake controlling apparatus therein of the present example embodiment, it is possible to select the control processing in a case where the gradient sensor 22 detects that the road gradient varies during execution of the constant speed downhill traveling function, on the basis of the option setting that is carried out by the user with use of the setting operation unit 19. Therefore, it is possible to select the control processing based on a request of the user with respect to variation of the road gradient during execution of the constant speed downhill traveling function.

As described above, one embodiment according to the technology has been described with reference to the accompanying drawings. However, the technology is not limited to the example embodiment described above. For example, in the example embodiment above, description has been given of the example case where the braking torque distribution for improving the regeneration efficiency is calculated with use of the parameter, for the vehicle speed, having the fluctuation range when the constant speed downhill traveling control is started and when the road gradient varies. However, timing when the braking torque distribution for improving the regeneration efficiency is calculated with use of the parameter, for the vehicle speed, having the fluctuation range is not limited to this case. Such timing may be any of various kinds of timing. For example, such braking torque distribution may be calculated only at timing when the constant speed downhill traveling control is started, only at timing when the road gradient varies, only at timing based on another status during execution of the constant speed downhill traveling control, or any other suitable timing. Moreover, various kinds of deformations or alternations of the details described in the example embodiment such as an amount of the fluctuation range that is allowed for the vehicle speed as the parameter when the braking torque distribution is calculated can be made without departing from the subject matter of the technology.

In one example embodiment, the gradient sensor 22 may serve as a "gradient sensor". In one example embodiment, the brake controlling unit 31 may serve as a "brake controlling unit". In one embodiment, the storage unit 32 may serve as a "storage unit". In one example embodiment, the setting operation unit 19 may serve as a "setting operation unit".

The brake controlling unit 31 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the brake controlling unit 31 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the brake controlling unit 31 illustrated in FIG. 1.

Although one example embodiment of the technology has been described in the foregoing by way of example with reference to the accompanying drawings, the technology is by no means limited to the example embodiment described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A brake controlling apparatus, comprising:
   a gradient sensor configured to detect a road gradient including a first road gradient of a downhill road in which a vehicle is traveling;
   an operation unit configured to switch a constant speed downhill traveling function between an effective state and an ineffective state, the constant speed downhill traveling function causing the vehicle to travel at a constant speed or within a constant speed range including the constant speed while the vehicle travels the downhill road;
   a brake controlling unit configured to control a first regenerating unit and a second regenerating unit, the first regenerating unit being configured to generate regenerative electric power from a first braking torque of only front wheels out of front and rear wheels of the vehicle, the second regenerating unit being configured to generate regenerative electric power from a second braking torque of only rear wheels out of the front and rear wheels; and
   a storage unit configured to hold an efficiency map, the efficiency map indicating a relationship among the first braking torque, the second breaking torque, wheel speeds of the front and rear wheels and a total regeneration efficiency for the front and rear wheels, wherein,
   while the constant speed downhill traveling function is in the effective states, the brake controlling unit is configured to:
   determine first braking torque distribution between the front wheels and the rear wheels on a basis of (i) the road gradient, (ii) the constant speed or the constant speed range and (iii) the efficiency map so that a first part of the total regeneration efficiency satisfies a first condition by the first braking torque distribution, and
   execute a first control processing to control the first regenerating unit and the second regenerating unit on a basis of the first braking torque distribution.

2. The brake controlling apparatus according to claim 1, wherein
   the first condition is that the first part of the total regeneration efficiency corresponds to a first location representing a highest value among values of the total regeneration efficiency selected based on the first road gradient and the constant speed range in the efficiency map; or that the first part of the total regeneration efficiency corresponds to a second location being within a predetermined range from the first location, and
   the brake controlling unit is configured to determine calculate the first braking torque distribution so as to satisfy the first condition.

3. The brake controlling apparatus according to claim 2, wherein, in a case where the road gradient that the gradient sensor detects varies from the first road gradient to a second road gradient that is different from the first gradient over a predetermined value while the brake controlling unit executes the first control processing, the brake controlling unit is configured to
   receive a current vehicle speed from a vehicle speed sensor;
   set parameter, for the vehicle speed, having a fluctuation range with respect to a vehicle speed,
   determine second braking torque distribution between the front wheels and the rear wheels on a basis of the second road gradient, the parameter and the efficiency map so that a second part of the total regeneration efficiency satisfies the first condition by the second braking torque distribution, and
   wherein the brake controlling unit is allowed to execute a second control processing to control the first regenerating unit and the second regenerating unit on a basis of the second braking torque distribution.

4. The brake controlling apparatus according to claim 3, wherein, in a case where the road gradient that the gradient sensor detects varies from the first road gradient to the second road gradient over the predetermined value while the brake controlling unit executes the first control processing the brake controlling unit is configured to select (i) maintaining an execution of the first control processing, or (ii)

stopping the execution of the first control processing and beginning an execution of the second control processing.

5. The brake controlling apparatus according to claim 4, wherein the brake controlling unit is configured to stop the execution of the first control processing and begin the execution of the second control processing, in a case where regeneration efficiency obtained by the second control processing is higher than regeneration efficiency obtained by the first control processing by a threshold value or more.

6. The brake controlling apparatus according to claim 5, further comprising
a setting operation unit configured to allow a user to perform setting wherein
the brake controlling unit is configured to select (i) maintaining the execution of the first control processing, or (ii) stopping the execution of the first control processing and beginning the execution of the second control processing on a basis of the setting performed with use of the setting operation unit.

7. The brake controlling apparatus according to claim 4, further comprising
a setting operation unit configured to allow a user to perform setting wherein
the brake controlling unit is configured to select (i) maintaining the execution of the first control processing, or (ii) stopping the execution of the first control processing and beginning the execution of the second control processing on a basis of the setting performed with use of the setting operation unit.

8. A vehicle comprising the brake controlling apparatus according to claim 4.

9. A vehicle comprising the brake controlling apparatus according to claim 3.

10. A vehicle comprising the brake controlling apparatus according to claim 2.

11. The brake controlling apparatus according to claim 1, wherein, in a case where the road gradient that the gradient sensor detects varies from the first road gradient to a second road gradient that is different from the first gradient over a predetermined value while the brake controlling unit executes the first control processing, the brake controlling unit is configured to
receive a current vehicle speed from a vehicle speed sensor;
set a parameter, for the vehicle speed, having a fluctuation range with respect to a vehicle speed,
determine second braking torque distribution between the front wheels and the rear wheels on a basis of the second road gradient, the parameter and the efficiency map so that a second part of the total regeneration efficiency satisfies the first condition by the second braking torque distribution, and
wherein the brake controlling unit is allowed to execute a second control processing to control the first regenerating unit and the second regenerating unit on a basis of the second braking torque distribution.

12. The brake controlling apparatus according to claim 11, wherein, in a case where the road gradient that the gradient sensor detects varies from the first road gradient to the second road gradient over the predetermined value while the brake controlling unit executes the first control processing the brake controlling unit is configured to select (i) maintaining an execution of the first control processing, or (ii) stopping the execution of the first control processing and beginning an execution of the second control processing.

13. The brake controlling apparatus according to claim 12, wherein the brake controlling unit is configured to stop the execution of the first control processing and begin the execution of the second control processing, in a case where regeneration efficiency obtained by the second control processing is higher than regeneration efficiency obtained by the first control processing by a threshold value or more.

14. The brake controlling apparatus according to claim 13, further comprising
a setting operation unit configured to allow a user to perform setting wherein
the brake controlling unit is configured to select (i) maintaining the execution of the first control processing, or (ii) stopping the execution of the first control processing and beginning the execution of the second control processing on a basis of the setting performed with use of the setting operation unit.

15. The brake controlling apparatus according to claim 12, further comprising
a setting operation unit configured to allow a user to perform setting wherein
the brake controlling unit is configured to select (i) maintaining the execution of the first control processing, or (ii) stopping the execution of the first control processing and beginning the execution of the second control processing on a basis of the setting performed with use of the setting operation unit.

16. A vehicle comprising the brake controlling apparatus according to claim 12.

17. A vehicle comprising the brake controlling apparatus according to claim 11.

18. A vehicle comprising the brake controlling apparatus according to claim 1.

19. A brake controlling apparatus, comprising:
a gradient sensor configured to detect a road gradient including a first road gradient of a downhill road in which a vehicle is traveling;
a user interface configured to switch a constant speed downhill traveling function between an effective state and an ineffective state, the constant speed downhill traveling function causing the vehicle to travel at a constant speed or within a constant speed range including the constant speed while the vehicle travels the downhill road;
a processor configured to control a first traveling motor and a second traveling motor, the first traveling motor being configured to generate regenerative electric power from a braking torque of only front wheels out of front and rear wheels of the vehicle, the second traveling motor being configured to generate regenerative electric power from a braking torque of only rear wheels out of the front and rear wheels; and
a memory configured to hold an efficiency map, the efficiency map indicating a relationship among the first braking torque, the second breaking torque, wheel speeds of the front and rear wheels and a total regeneration efficiency for the front and rear wheels, wherein,
while the constant speed downhill traveling function is effective in the effective states, the circuitry is configured to:
determine first braking torque distribution between the front wheels and the rear wheels on a basis of the first road gradient, (ii) the constant speed or the constant speed range and (iii) the efficiency map so that a first part of the total regeneration efficiency satisfies a first condition by the first braking torque distribution, and execute a first control processing to control the first regenerating unit and the second regenerating unit on a basis of the first braking torque distribution.

20. A vehicle comprising the brake controlling apparatus according to claim 19.

* * * * *